INVENTORS
JOHN H. SEXSTONE
MICHAEL B. HAGAN
BY
ATTORNEYS

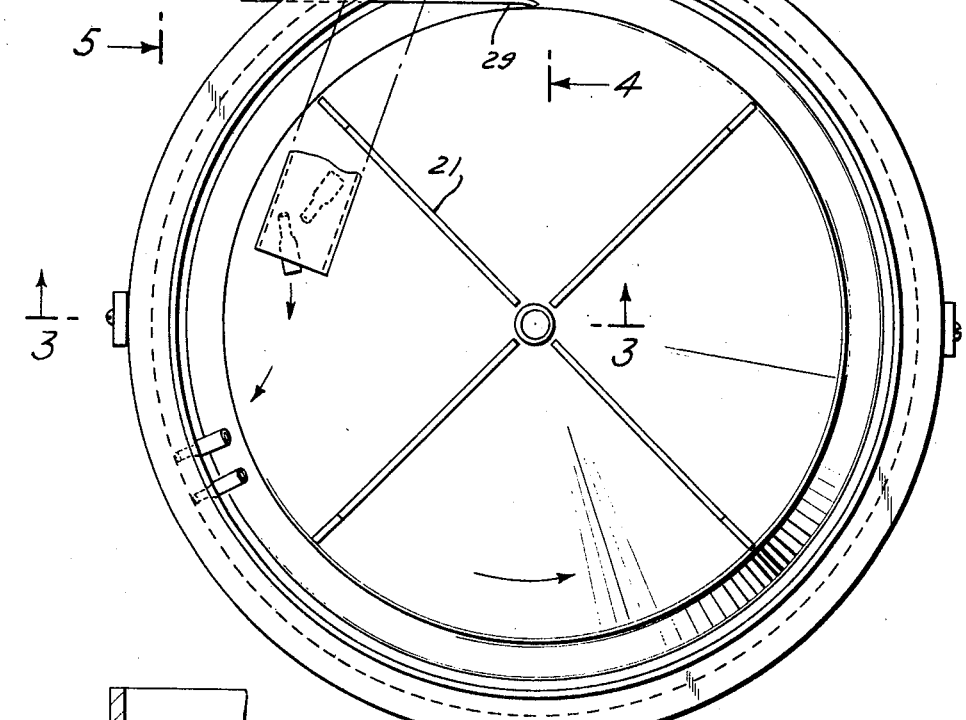
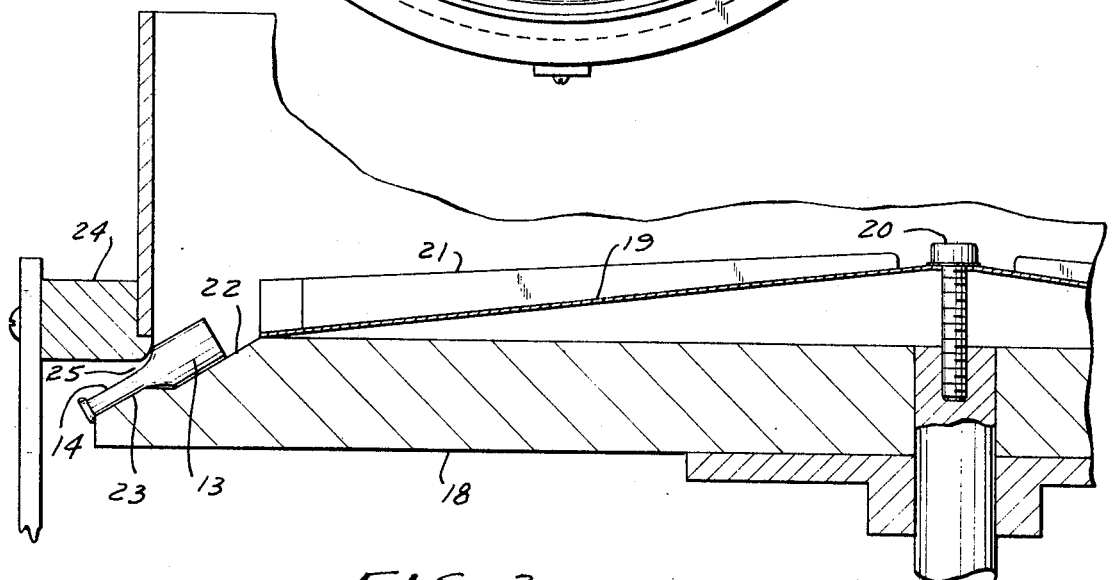

May 26, 1970  J. H. SEXSTONE ET AL  3,513,856
MACHINE FOR INSERTING FILTER PLUG SECTIONS INTO PLASTIC
CIGAR MOUTHPIECES
Filed May 6, 1968  4 Sheets-Sheet 3
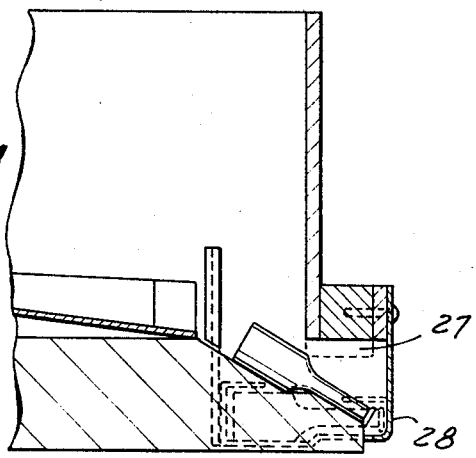
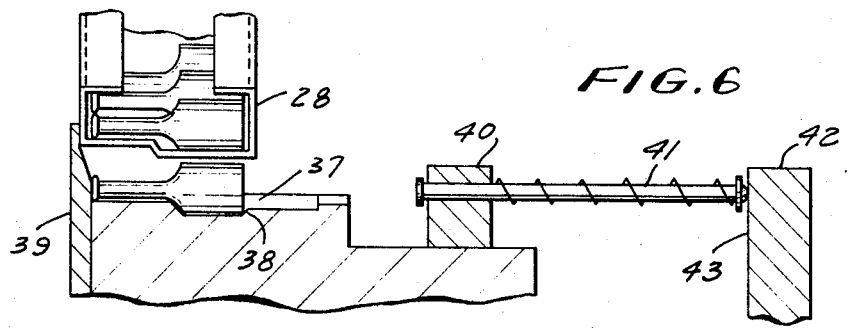
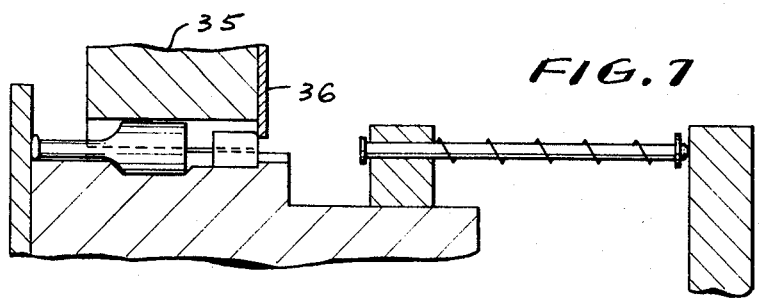
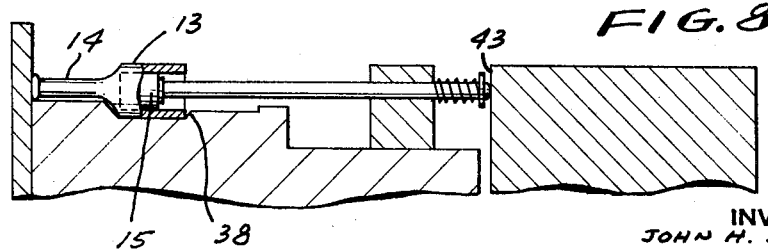
INVENTORS
JOHN H. SEXSTONE
MICHAEL B. HAGAN
BY
ATTORNEYS United States Patent Office 3,513,856
Patented May 26, 1970

3,513,856
MACHINE FOR INSERTING FILTER PLUG SECTIONS INTO PLASTIC CIGAR MOUTHPIECES
John H. Sexstone and Michael B. Hagan, Louisville, Ky., assignors to Brown & Williamson Tobacco Corporation, Louisville, Ky., a corporation of Delaware
Filed May 6, 1968, Ser. No. 726,742
Int. Cl. A24c 5/48, 5/50
U.S. Cl. 131—94                                   4 Claims

ABSTRACT OF THE DISCLOSURE

A machine having a fluted rotatable assembly drum upon which filter plug sections are inserted into plastic mouthpieces. The mouthpieces are fed to the assembly drum from an orientation mechanism which receives the mouthpieces in random fashion and aligns them for proper positioning in the flutes of the assembly means. The filter plug sections are fed to the assembly drum from a storage hopper, such that the mouthpieces and plug sections are in coaxial alignment on the assembly drum prior to the insertion of the plug sections into the respective mouthpieces. Means for inserting the filter plug sections into the open end of the mouth pieces are carried by the assembly drum.

BACKGROUND AND SUMMARY OF THE INVENTION

In the recent past, the use of plastic mouthpieces with both cigars and cigarettes has come into general use. The mouthpieces are generally mounted to one end of the cigar or cigarette and are discarded along with the butt end when the smoke is completed.

The desirability of incorporating a unitary filter into such a plastic mouthpiece has been recognized, and indeed such a product has been marketed. However, the commercial exploitation of the device has been retarded by the lack of an efficient apparatus for assemblying the filter into the mouthpiece. In particular, the machines of present design are unable to both orient the mouthpieces and insert the filters into the mouthpieces with sufficient speed to meet modern production demands. The result is a high cost per article and the employment of several expensive machines to meet output requirements. In addition, the machines in present use are inherently unreliable in that many mouthpieces do not receive a filter, and those that do receive a filter often have it damaged during insertion.

In a broad sense, this invention is directed to a machine for assembling a filter plug member into a plastic cigar or cigarette mouthpiece which includes a transfer and orientation mechanism for the mouthpieces, a transfer mechanism for the filter plug members, an assembly drum having flutes adapted to receive both a plastic mouthpiece and a filter plug in axially aligned relation, and means on the assembly drum to insert the filter plug into the plastic mouthpiece.

It is an object of this invention to provide an assembly machine which is capable of assembling filter plugs into plastic mouthpieces in an efficient and expeditious manner such that a low cost per article and a high rate of production may be obtained. A further object of this invention is to provide a machine which is simple in design, reliable in performance, and which operates with a minimum of manual attention.

Further objects and advantages of the present invention will readily come to mind as the following description is developed.

BRIEF DESCRIPTION OF THE DRAWINGS

Referring to the drawings illustrating one form of the invention:

FIG. 2 is a fragmentary plan view of the orienting mechanism for the mouthpieces;

FIG. 3 is an enlarged horizontal sectional view taken along the line 3—3 of FIG. 2;

FIG. 4 is an enlarged horizontal sectional view taken along the line 4—4 of FIG. 2;

FIG. 5 is an enlarged horizontal sectional view of the chute taken along the line 5—5 of FIG. 2;

FIG. 6 is a sequential horizontal sectional view through the assembly drum at the delivery end of the chute;

FIG. 7 is a view similar to FIG. 6 but at the second fluted wheel;

FIG. 8 is a view similar to FIG. 6 but during the camming and insertion operation;

DESCRIPTION OF THE PREFERRED EMBODIMENT

Figure 1:
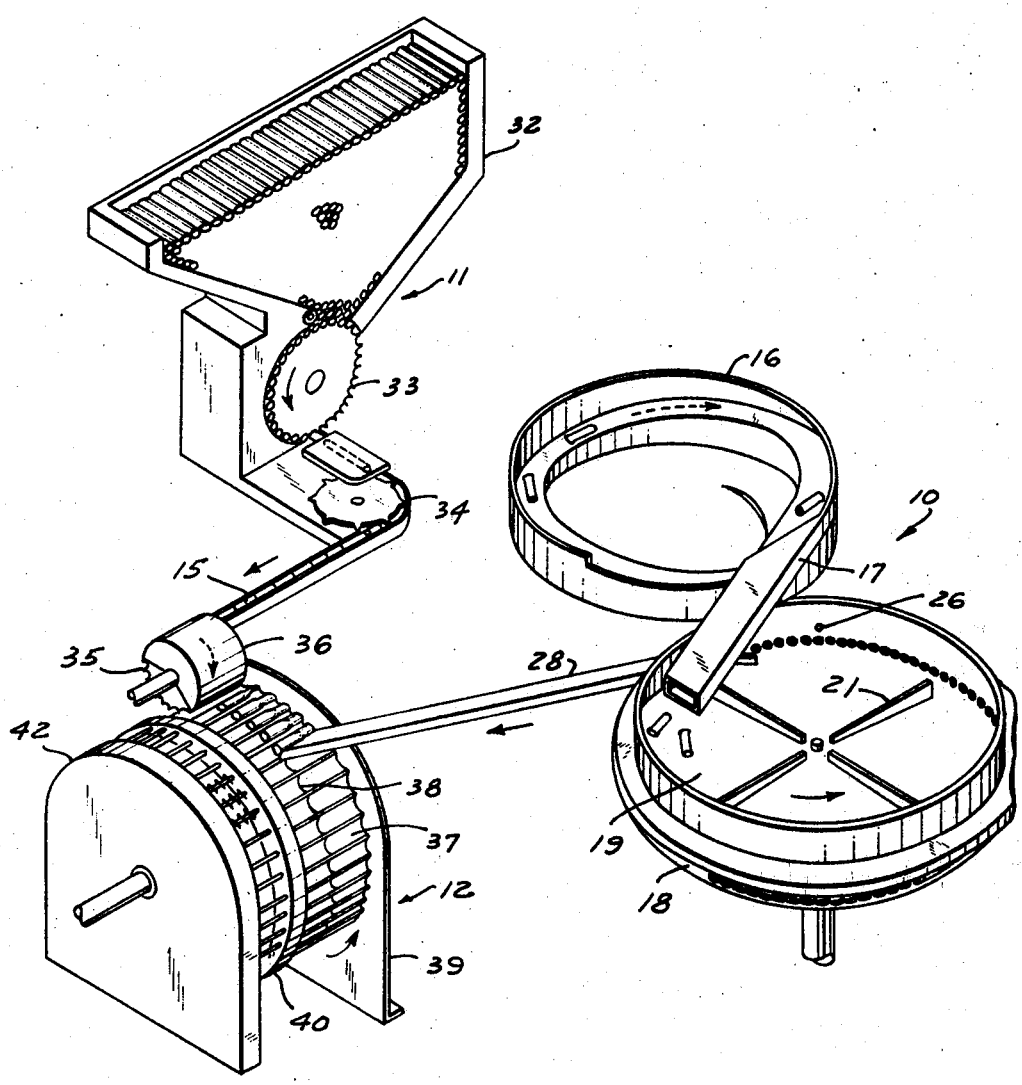
FIG. 1 is a perspective view of the machine showing its general layout.

An assembly machine embodying the invention is shown in the drawings and generally comprises a feeding and orienting mechanism 10 for plastic cigar mouthpieces, a feeding machine 11 for the filters, and an assembly drum 12 which is designed to receive both the mouthpieces and the filters and insert the filters into the mouthpieces.

As seen in various figures, the plastic cigar mouthpieces of the type employed with this invention, generally have a tubular end 13 which is adapted to receive one end of a cigar or cigarette, and a flattened end 14 designed to be held by the smoker's teeth or lips. The tubular end of the mouthpiece is of sufficient length to permit a filter 15 to be inserted therein (note FIG. 8) prior to its being mounted on the cigar. Thus the smoke from the cigar is drawn through the filter prior to entering the smoker's mouth. The filter 15 is of conventional design and may be made from any common filtering material, such as cellulose acetate filaments or other filamentary material. While the term "cigar" is used herein to describe the mouthpieces of the subject invention, it is intended that this term encompass all common smoking devices such as cigars, cigarettes and pipes.

Referring specifically to the feeding and orienting mechanism 10, the cigar mouthpieces are initially placed in a vibratory parts feeder 16 of well known design, such as the Syntron parts feeder. As the feeder vibrates, the mouthpieces travel along an inclined plane in a random fashion to a chute 17 for transfer onto a rotatable circular orienting table 18. The table includes an upper circular plate 19 which is secured to the table by means of a centering bolt 20 to provide a common axis of rotation with the table. The plate is of domed or spheroidal shape and includes a number of radial ribs 21 such that upon rotation of the table, the mouthpieces which are received from the parts feeder through chute 17 are thrown to the outer edge. The outer edge or periphery of the table is beveled as shown in FIG. 3 to form two tapered surfaces 22 and 23 which generally conform to the longitudinal outer shape of the mouthpiece. A stationary cylindrical skirt 24 is positioned in spaced relation and closely adjacent to the tapered outer periphery of the table to form an annular opening 25 therebetween. The annular opening 25 is sufficiently wide to receive the flattened end 14 of the mouthpiece but not sufficiently wide to receive the tubular end 13.

As the table rotates, the ribs 21 on the upper plate of the table strike the mouthpiece and throw them to the outer edge where the flattened ends 14 of the properly aligned mouthpieces fall into the annular opening 25. The mouthpieces which have fallen into the annular opening will tend to travel circumferentially along the opening in the direction of the rotation of the table. In order to facilitate this movement, the tapered surfaces 22 and 23 at the peripheral edge of the table may be roughened or knurled to provide a greater friction force. In the alternative, the table may be made from a fibrous material which would similarly increase the friction developed between the table and the mouthpieces.

The mouthpieces which are not in proper alignment and have not fallen into the annular opening, will also move in the direction of rotation of the table until reaching the airstream 26 which directs them back onto the upper plate 19 where they will again be thrown to the outer periphery for orientation.

An outlet opening 27 for the removal of the mouthpieces from the annular opening is formed in the skirt 24 along a tangent to the circumference of the table. The opening 27 is formed by removing a portion of the skirt as shown in FIG. 4 and leads to a connecting chute 28. A baffle 29 and a guide strip 30 are placed on either side of the outlet opening to guide the mouthpieces into the chute 28. The chute 28 has an open lower surface 31 at the end adjacent the orienting table to permit non-oriented mouthpieces which may have entered the chute to drop therethrough.

A desirable feature of this invention is the fact that the friction imparted to the mouthpieces from their contact with the rotating table while positioned in the annular opening produces a back pressure and thus a force feed into the chute 28. This back pressure not only facilitates entry of the mouthpieces into the chute but also assures that the mouthpieces will be deposited in each flute of the assembly drum as hereinafter further described.

Referring now to the feeding mechanism 11 for the filters 15, a hopper 32 for holding standard length filter rods is shown in FIG. 1. A fluted wheel 33 is mounted for rotation at the outer portion of the hopper to convey individual filter rods from the hopper to a traveling belt (not shown). The belt then passes the filter rods through a cutting station 34 which cuts them into the desired final length. The cut segments which form the filters 15, are then transported by a suitable mechanism to a second fluted wheel 35. The individual filters 15 are positioned in the flutes of this wheel by an airstream or other conventional mechanism. Upon rotation of the second fluted wheel 35 in the direction shown, the filter rods are transported to and deposited in the flutes of the assembly drum. A cover 36 is positioned over a portion of the second fluted wheel to maintain proper alignment of the filters 15 during the transfer process. Since the particular structural details of the feeding mechanism 11 form no part of this invention, and since such devices are well known in the art, the details have not been illustrated herein for purposes of conciseness.

Figure 9:
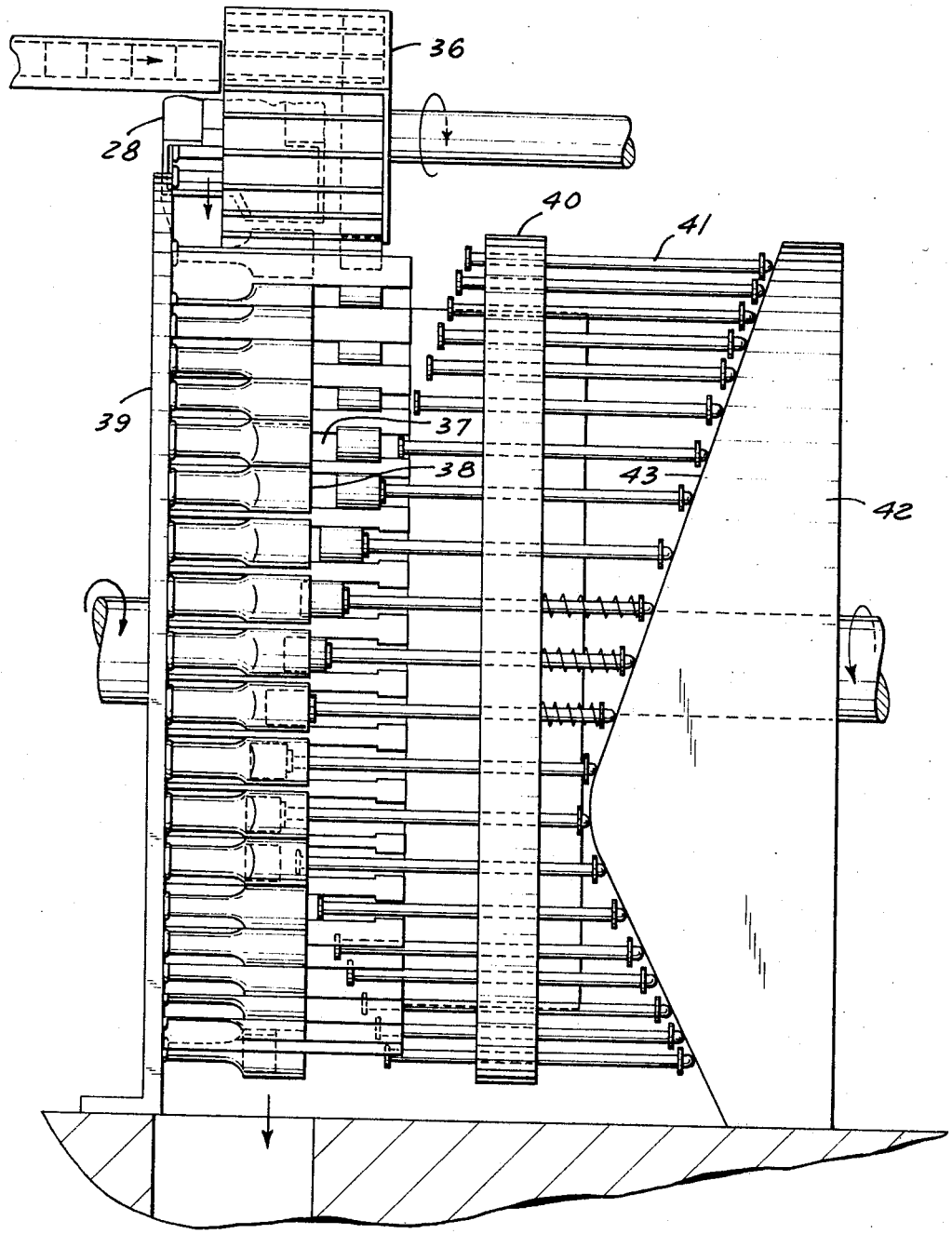
FIG. 9 is a side elevational view, partly in section, of the assembly drum.

The assembly of the filters into the mouthpieces is effected on the rotatable assembly drum 12 as shown in FIGS. 1 and 9. The drum has a plurality of axial oval flutes 37 positioned around its entire outer circumference. The flutes on one side (left side as seen in FIG. 9) of the drum are machined to accept the plastic mouthpieces, while the flutes on the other side are machined to accept the filter plugs. Since the mouthpiece has a larger diameter than the plug, a shoulder 38 is thereby formed in the flutes.

The mouthpieces are received in the flutes 37 of the drum from the chute 28 upon rotation of the drum in the direction indicated, and are positioned against the shoulder by the stationary side abutment 39. As previously noted, the back pressure on the mouthpieces in the chute 28 assures that a mouthpiece will be deposited in each flute. The mouthpieces then travel under the second fluted wheel 35 where a filter 15 is positioned in axial alignment with each mouthpiece, note FIG. 7.

A circumferential ring 40 is attached to one end of the assembly drum and retains a spring-loaded plunger 41 in axial alignment with each flute. Thus, as the assembly drum rotates, the ring 40 and the spring-loaded plunger 41 also rotate. A stationary cam 41 having a camming surface 43 is positioned at the side of the drum adjacent the plungers. As the assembly drum rotates, the plungers 41 contained in the ring 40 are depressed in an axial direction by the camming surface 43, and the plungers in turn push the filters into the plastic mouthpieces (note FIGS. 6–9). It will be seen that since the slope of the camming surface 43 is gradual, insertion of the filters into the mouthpieces takes place relatively slowly. This in turn permits a high running speed for the machine.

As seen in FIG. 8, the depth of the shoulder 38 closely corresponds to the thickness of the tubular end 13 of the mouthpiece. This factor, along with the conforming oval shape of the flute 37, insures the accurate entry of the filter 15 into the mouthpiece with little or no deformation at the forward end of the filter.

While the invention has been described by reference to a preferred embodiment thereof, it is not intended that the scope be limited thereby except insofar as the appended claims are so limited, since modifications coming within the purview of my invention will readily suggest themselves to one skilled in the art.

We claim:

1. A machine for transferring and orienting a tubular member and a plug member from remote points to an assembly point and for assembling the tubular member and plug member into a unitary structure comprising:

a transfer and orientation mechanism for said tubular member, a rotatable assembly drum having flutes positioned on the circumference thereof to receive said tubular member and plug member in axially aligned relation, plungers slidably carried on said assembly drum at the circumference thereof with each of said plungers being axially aligned with a corresponding flute, said flutes and said plungers being continuously axially aligned with each other, said transfer and orientation mechanism including chute means for transferring and positioning the oriented tubular members from said orientation mechanism into said flutes on said assembly drum, a feed and transfer mechanism for positioning said plug members in said flutes on said assembly drum in axially aligned relation with said tubular members, and stationary cam means positioned adjacent said assembly drum to contact said plungers, such that upon rotation of said assembly drum said plungers are depressed by said cam means causing said plug members to be inserted into and assembled with said tubular members.

2. A machine for inserting filter plug members into the tubular end of cigar mouthpieces comprising:

a transfer and orientation mechanism for said mouthpieces including a vibratory parts feeder, a rotatable circular table for receiving said mouthpieces from said parts feeder, and means at the outer periphery of said table for orienting said mouthpieces, a rotatable assembly drum having flutes positioned on the circumference thereof, said flutes being adapted to receive said mouthpieces and said filter plug members in axially aligned relation, said drum having spring loaded plungers positioned on the circumference thereof with one of said plungers being axially aligned with each flute, chute means leading from the outer periphery of said circular table to said flute means on said assembly drum for receiving said oriented mouthpieces and transferring them to said flutes of said assembly drum, a feed and transfer mechanism for positioning said filter plug members in said flutes on said assembly drum in axially aligned relation with said mouthpieces, and stationary cam means positioned adjacent said assembly drum to contact said plungers, whereupon rotation of said assembly drum causes said spring loaded plungers to be depressed by said cam means, and said filter plug members to be inserted into the tubular end of said mouthpieces.

3. A machine for inserting a plug member into a tubular member comprising means for orienting said tubular member comprising a rotatable circular table, and a stationary cylindrical skirt positioned closely adjacent to the outer periphery of said table to form an annular opening therebetween, said annular opening being adapted to receive one end of said tubular member;

means for transferring said tubular member;

means for orienting and transferring said plug member;

means for receiving said tubular member and plug member in coaxial alignment comprising a rotatable drum having flutes positioned on the circumference; and means for inserting said plug member into said tubular member comprising a plurality of plungers positioned on the circumference of said drum with one of said plungers being axially aligned with each flute, and further including a stationary cam positioned adjacent said drum to contact said plungers.

4. A machine for inserting a plug member into a tubular member;

means for orienting and transferring said plug member;

means for receiving both said tubular member and plug member in coaxial alignment thereon prior to insertion of said plug member into said tubular member comprising a rotatable drum having flutes positioned on the circumference; and means carried by said drum for inserting said plug member into said tubular member.

References Cited

UNITED STATES PATENTS

| 1,830,446 | 11/1931 | Schunemann | 131—88 |
| 2,820,460 | 1/1958 | Bunzl et al. | 131—94 X |
| 3,115,233 | 12/1963 | Dick et al. | 198—33 |
| 3,362,413 | 1/1968 | Redford et al. | 131—94 |
| 3,398,753 | 8/1968 | Stelzer | 131—88 |

FOREIGN PATENTS

| 1,469,920 | 1/1967 | France. |
| 6,515,435 | 5/1966 | Netherlands. |

ALDRICH F. MEDBERY, Primary Examiner

J. H. CZERWONKY, Assistant Examiner

U.S. Cl. X.R.

131—88